United States Patent
Tsirkin (10) Patent No.: US 10,257,166 B2
(45) Date of Patent: Apr. 9, 2019

(54) GUEST NETFILTER PROTECTION BY VIRTUAL MACHINE FUNCTION

(71) Applicant: Red Hat Israel, Ltd., Ra'anana (IL)

(72) Inventor: Michael Tsirkin, Westford, MA (US)

(73) Assignee: Red Hat Israel, Ltd, Ra'anana (IL)

( * ) Notice: Subject to any disclaimer, the term of this patent is extended or adjusted under 35 U.S.C. 154(b) by 245 days.

(21) Appl. No.: 15/251,462

(22) Filed: Aug. 30, 2016

(65) Prior Publication Data
US 2018/0063083 A1 Mar. 1, 2018

(51) Int. Cl.
*H04L 29/06* (2006.01)
*G06F 12/1009* (2016.01)
*G06F 9/455* (2018.01)

(52) U.S. Cl.
CPC ...... *H04L 63/0245* (2013.01); *G06F 9/45558* (2013.01); *G06F 12/1009* (2013.01); *H04L 63/0263* (2013.01); *G06F 2009/45587* (2013.01); *G06F 2009/45595* (2013.01); *G06F 2212/1052* (2013.01); *G06F 2212/151* (2013.01); *G06F 2212/154* (2013.01)

(58) Field of Classification Search
USPC .......................................................... 726/13
See application file for complete search history.

(56) References Cited

U.S. PATENT DOCUMENTS

| | | | |
|---|---|---|---|
| 8,464,254 B1 | 6/2013 | Vohra et al. | |
| 8,490,086 B1 | 7/2013 | Cook et al. | |
| 8,954,964 B2 | 2/2015 | Weinstein et al. | |
| 8,972,981 B2 | 3/2015 | Delco et al. | |
| 9,036,464 B2 | 5/2015 | Droux et al. | |
| 9,165,140 B2 | 10/2015 | McGee | |
| 9,268,707 B2 | 2/2016 | Sahita et al. | |
| 2010/0100718 A1 | 4/2010 | Srinivasan | |
| 2013/0227556 A1 | 8/2013 | Tsirkin et al. | |
| 2017/0054686 A1* | 2/2017 | Malkov | G06F 9/45558 |

OTHER PUBLICATIONS

Virtualized Networking Concepts and Terms, Microsoft, retrieved on May 5, 2016, Link: https://msdn.microsoft.com/en-us/library/windows/hardware/gg605194(v=vs.85).aspx (7 pages).

* cited by examiner

*Primary Examiner* — Kambiz Zand
*Assistant Examiner* — Aubrey H Wyszynski
(74) *Attorney, Agent, or Firm* — K&L Gates LLP (57) ABSTRACT

A system and method for guest netfilter protection using a virtual machine function includes a memory, one or more processors, in communication with the memory, a virtual machine, a hypervisor, and a virtual network interface controller on the virtual machine. The virtual machine and the hypervisor are configured to execute on the one or more processors. The hypervisor is configured to boot a guest operating system on the virtual machine. Then, the guest operating system is configured to send a list of networking filter rules to a virtual machine function executing on the virtual machine. The virtual machine function is configured to store the list of networking filter rules in a virtual machine function memory. The hypervisor is further configured to prevent the guest operating system from directly accessing the virtual network interface controller and allow the virtual machine function to access the virtual network interface controller.

20 Claims, 7 Drawing Sheets

FIG. 1

Default Host Page Table 182A

| 210A<br>x0001 | 220A<br>Read-Only | 230A<br>x03FF |
|---|---|---|
| 210B<br>x0002 | 220B<br>Read-Write | 230B<br>x040F |
| 210C<br>x0003 | 220C<br>Executable | 230C<br>x041F |
| 210D<br>x0004 | 220D<br>Executable Only | 230D<br>x042F |
| 210E<br>x0005 | 230E<br>Inaccessible | 230E<br>x043F |

Alternate Host Page Table 182B

| 240A<br>x0001 | 250A<br>Read-Write | 260A<br>x01AF |
|---|---|---|
| 240B<br>x0002 | 250B<br>Read-Write | 260B  VM Function<br>x01FF |
| 240C<br>x0003 | 250C<br>Read-Write | 260C  VM Function<br>x024F |
| 240D<br>x0004 | 250D<br>Read-Write | 260D  VM Function<br>x029F |
| 240E<br>x0005 | 250E<br>Read-Write | 260E  VM Function<br>x02EF |
| 240F<br>x0006 | 250F<br>Read-Write | 260F<br>x033F |

FIG. 2

Default Page View 310
- 330A Read-Only
- 330B Read-Write
- 330C Executable
- 330D Executable Only
- 330E Inaccessible

Alternate Page View 320
- 340A Read-Write
- 340B VM Function Read-Write
- 340C VM Function Read-Write
- 340D VM Function Read-Write
- 340E VM Function Read-Write
- 340F Read-Write

GUEST NETFILTER PROTECTION BY VIRTUAL MACHINE FUNCTION

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines, which may increase the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides new and innovative methods and systems for guest netfilter protection using a virtual machine function. An example system includes a memory, one or more processors, in communication with the memory, a virtual machine, a hypervisor, and a virtual network interface controller on the virtual machine. The virtual machine and the hypervisor are configured to execute on the one or more processors. The hypervisor is also configured to boot a guest operating system on the virtual machine. Then, the guest operating system is configured to send a list of networking filter rules to a virtual machine function. The virtual machine function is configured to be executed on the virtual machine. The virtual machine function is configured to store the list of networking filter rules in a virtual machine function memory. The hypervisor is further configured to prevent the guest operating system from directly accessing the virtual network interface controller and allow the virtual machine function to access the virtual network interface controller.

An example method includes booting, by a hypervisor executing on one or more processors on a computer system, a guest operating system on a virtual machine. The method also includes sending, by the guest operating system, a list of networking filter rules to a virtual machine function executing on the virtual machine and storing, by the virtual machine function, the list of networking filter rules in a virtual machine function memory. The method also includes preventing, by the hypervisor, the guest operating system from directly accessing a virtual network interface controller on the virtual machine and allowing the virtual machine function to access the virtual network interface controller.

Additional features and advantages of the disclosed methods and system are described in, and will be apparent from, the following Detailed Description and the Figures.

DETAILED DESCRIPTION OF EXAMPLE EMBODIMENTS

Described herein are methods and systems for guest netfiler protection by virtual machine function. Operating systems may generally provide network filtering or firewall protection to prevent a malicious application from causing damage to a computer system, for example, by limiting the kind of network traffic allowed. Unfortunately, this does not prevent a malicious kernel level code from inserting arbitrary traffic into the network, in which case firewall rules in memory can be edited or the firewall can be bypassed by directly accessing a network interface controller. Furthermore, firewalls and network filters are not effective in protecting the system from a privilege escalation attack, which is becoming more common. A privilege escalation attack is a type of network intrusion that involves exploitation of a vulnerability in kernel code to grant the attacker elevated access to the network and its associated data and applications. Although it is possible for a host machine to install a firewall on the hypervisor of the host operating system, it would be difficult to manage the system because networking filter rules need to be installed separately from the guest operating system, and thus it may not meet the guest's needs efficiently. For example, when booting the guest operating system, the rules may require allowing TFTP protocol packets to load the guest operating system, but these TFTP protocol packets may then need to be blocked after the booting of the guest operating system.

Aspects of the present disclosure may address the above noted deficiency by providing guest netfilter protection using a virtual machine function. As described herein, netfilter protection may refer to a packet filtering framework provided by a guest, for example, using the Linux kernel, which enables packet management including packet filtering and network address/port translation. In an example, a hypervisor may prevent a guest operating system from accessing a virtual network interface controller unless the guest operating system is using a virtual machine function. The hypervisor may also prevent the guest operating system from accessing the virtual machine function unless the guest operating system is executing a specific instruction (e.g., VMFUNC). For example, a hypervisor may boot a guest operating system, and then the guest operating system may send a list of networking filter rules to a virtual machine function. Then, the virtual machine function may store the list of networking filter rules in a virtual machine function memory. Once the networking filter rules are stored in the memory, the guest operating system may not be able to modify the rules and its access to a virtual network interface controller may also be blocked. In order to transmit a packet, the guest operating system may need to submit the packet to a virtual machine function instead of a virtual network interface controller. Then, the virtual machine function may determine whether the packet satisfies the networking filter rules. If the packet satisfies the networking filter rules, the virtual machine function may send the packet to the virtual network interface controller.

In an example aspect, the virtual machine function may detect a packet coming from the virtual network interface controller and determine whether the packet satisfies the networking filter rules, and if satisfied, the virtual machine function may send the packet to the guest operating system. In a further aspect, the virtual machine function may be provided and initialized by the guest operating system. In this way, all incoming and outgoing packets may need to go through a virtual machine function. Therefore, aspects of the present disclosure may be capable of preventing network intrusion using a vulnerability in kernel code, such as a privilege escalation attack. Furthermore, since the virtual machine function may be provided and initialized by the guest operating system, rather than by the host, it may be easier to manage the system and match the guest operating system's needs. Additional features and advantages of the disclosed method, system, and apparatus are described below.

Figure 1:
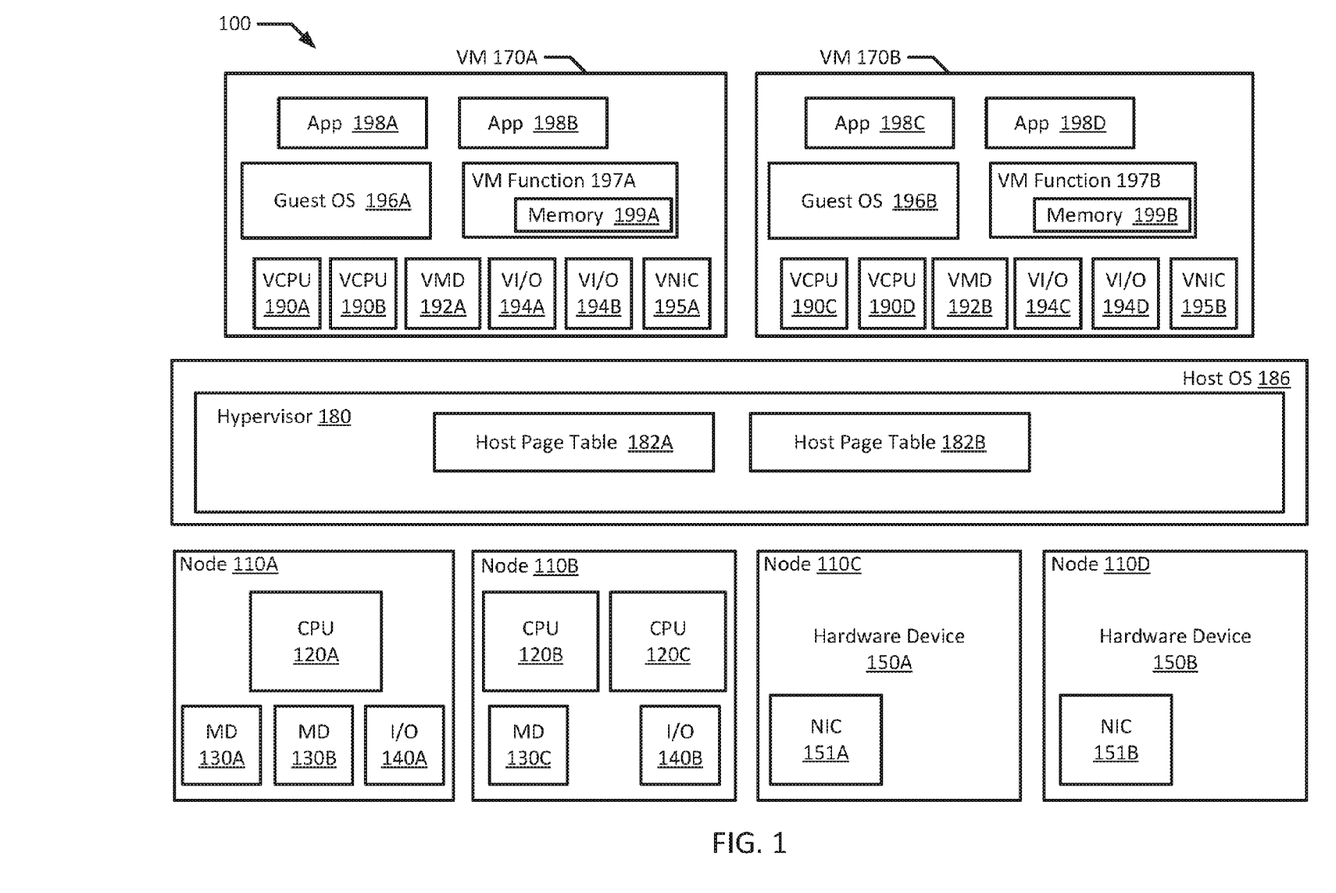
FIG. 1 is a block diagram of an example multiprocessor computer system according to an example of the present disclosure.

FIG. 1 depicts a high-level component diagram of an example multi-processor computer system 100 for guest netfilter protection by virtual machine function according to an example of the present disclosure.

The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example, a hardware device (e.g., 150A-B) may include a network device (e.g., a network interface controller (NIC) 151A-B, a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, including a point-to-point processor interconnect, and a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 may refer to CPU 120A-C, MD 130A-C, I/O 140A-B, a software device, and/or hardware device 150A-B.

As noted above, computer system 100 may run multiple virtual machines (e.g., VM 170A-B), by executing a software layer (e.g., hypervisor 180) above the hardware and below the virtual machines 170A-B, as schematically shown in FIG. 1. In an example, the hypervisor 180 may be a component of the host operating system 186 executed by the computer system 100. In another example, the hypervisor 180 may be provided by an application running on the operating system 186, or may run directly on the computer system 100 without an operating system beneath it. The hypervisor 180 may virtualize the physical layer, including processors, memory, I/O devices, and network interface controllers, and present this virtualization to virtual machines 170A-B as devices, including virtual processors (e.g., VCPU 190A-D), virtual memory devices (e.g., VMD 192A-B), virtual I/O devices (e.g., VI/O 194A-D), and/or virtual network interface controllers (e.g., VNIC 195A-B).

In an example, a virtual machine 170A-B may execute a guest operating system 196A-B which may utilize the underlying VCPU 190A-D, VMD 192A-B, VI/O 194A-D, and VNIC 195A-B devices. One or more applications 198A-D may be running on a virtual machine 170A-B under the guest operating system 196A-B. In an example, a device may be a device (e.g., VCPU 190A-D, VMD 192A-B, VI/O devices 194A-D, VNIC 195A-B, etc.) of a guest operating system 196A-B (that is, a "guest device").

A virtual machine 170A-B may run any type of dependent, independent, compatible, and/or incompatible applications on the underlying hardware and OS 186. In an example, applications (e.g., App 198A-D) executing on a virtual machine 170A-B may be dependent on the underlying hardware and/or OS 186. In another example, applications 198A-D executing on a virtual machine 170A-B may be independent of the underlying hardware and/or OS 186. For example, applications 198A-B executing on a first virtual machine 170A may be dependent on the underlying hardware and/or OS 186 while applications 198C-D executing on a second virtual machine 170B are independent of the underlying hardware and/or OS 186. Additionally, applications 198A-D executing on a virtual machine 170A-B may be compatible with the underlying hardware and/or OS 186. In an example, applications 198A-D executing on a virtual machine 170A-B may be incompatible with the underlying hardware and/or OS 186. For example, applications 198A-B executing on one virtual machine 170A may be compatible with the underlying hardware and/or OS 186 while applications 198C-D executing on another virtual machine 170B may be incompatible with the underlying hardware and/or OS 186. In an example, a device may be implemented as a virtual machine 170.

In an example, a virtual machine 170A-B may include multiple virtual processors (VCPU) 190A-D. Processor virtualization may be implemented by the hypervisor 180 scheduling time slots on one or more physical processors 120A-C such that from the guest operating system's perspective those time slots are scheduled on a virtual processor 190A-D.

In an example, the guest OS 196A-B may provide one or more virtual machine functions (VM Functions) 197A-B to a virtual machine 170A-B. In an example, the VM Function 197A-B may be initialized by the guest OS 196A-B. In an example, the VM Function 197A may be invoked for a VM 170A, by the guest OS 196A that is running on the VM 170A. In an example, a VM Function 197A may only be invoked if hypervisor 180 provides access or grants a request. In an example, a hypervisor 180 may grant a VM 170A or guest OS 196A access to a VM Function 197A to allow the VM 170A or guest OS 196A to switch host page tables without an exit to the hypervisor. In an example, the hypervisor 180 may also deny the request by causing an undefined opcode exception or a general protection fault exception whenever the VM Function 197A-B is invoked. In an example, a VM Function 197A-B may include a virtual machine function memory 199A-B. In an example, the virtual machine function memory 199A-B may be accessible to the guest OS 196A-B.

The hypervisor 180 may also include one or more host page tables, such as a default host page table 182A and an alternative host page table 182B. In an example, the host page table may be an extended page table ("EPT"), translating guest physical addresses to host physical addresses. In another example, the host page table may be the shadow page table translating the guest virtual addresses to host physical addresses. In another example, the host page table may be the hypervisor page table, translating the guest physical addresses to hypervisor virtual addresses. Examples of these data structures are described in greater detail below and as shown in FIG. 2.

Figure 2:
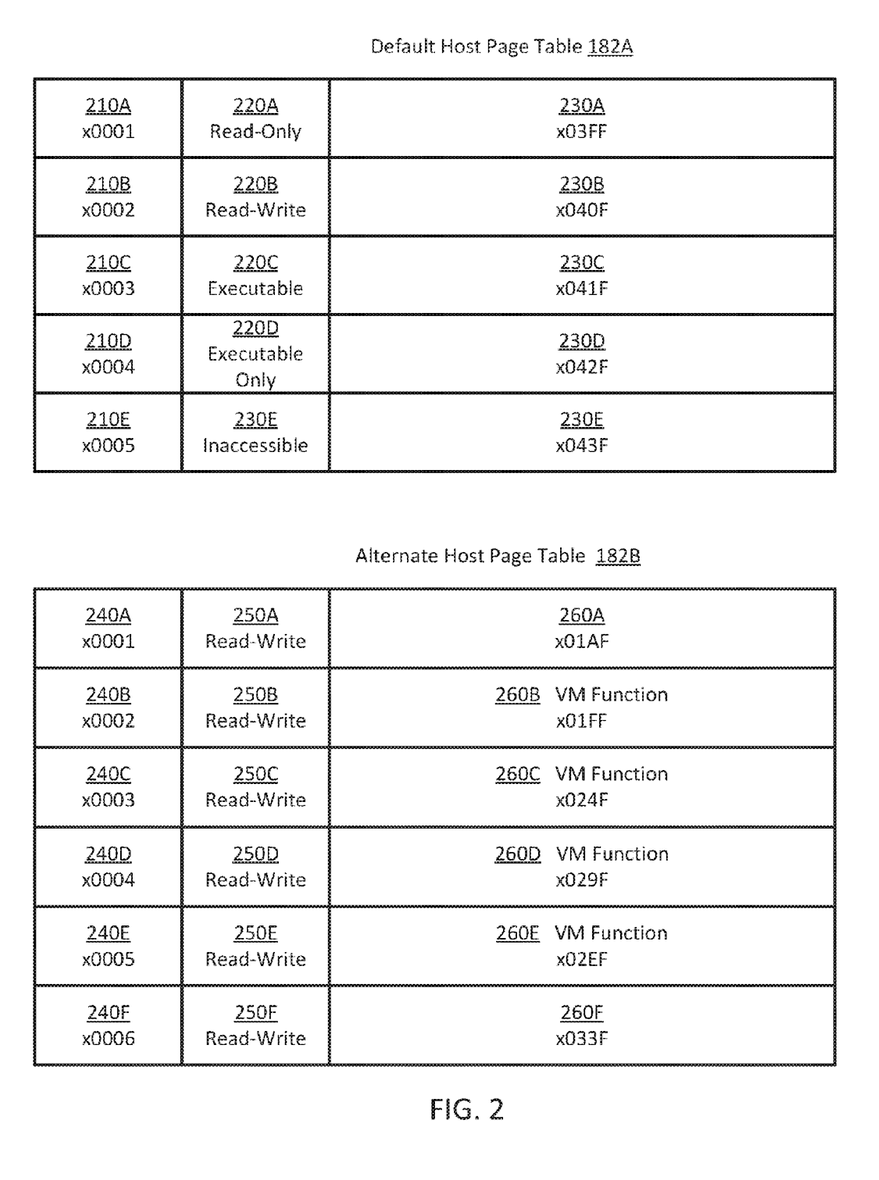
FIG. 2 a block diagram of example default and alternate host page tables according to an example of the present disclosure.
Figure 3:
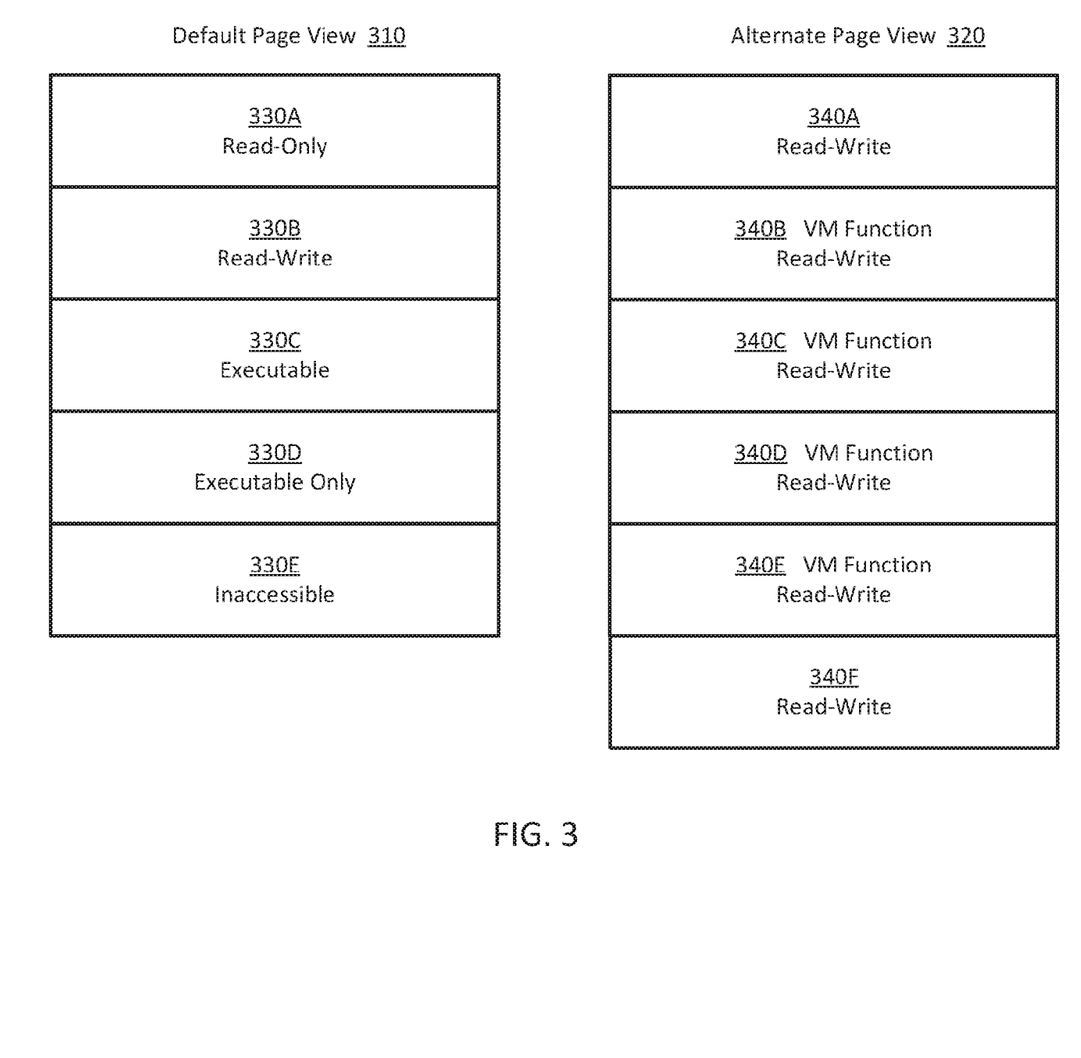
FIG. 3 is a block diagram of example default and alternate page views according to an example of the present disclosure.

FIG. 2 illustrates a default host page table (otherwise referred to as a page table) 182A and an alternative host page table 182B according to an example of the present disclosure. In general, the hypervisor 180 may manage the memory usage of the VMs 170A-B. Both virtual memory and physical memory may be divided into pages which are identified with a unique number (e.g., Page Frame Number (PFN) 210A-E or 240A-F). Examples of pages and page views are described in greater detail below and as shown in FIG. 3.

The host page tables 182A-B are data structures used by the hypervisor 180 to store a mapping of addresses of the guest OS 196A-B to addresses of the host OS 186 (e.g., physical resources of the computer system 100). Accordingly, address translation is handled using the host page tables 182A-B. For example, a guest OS 196A-B operating within the VMs 170A-B may be given the impression that there is a contiguous section of guest memory available, when in reality, the available guest memory may be spread across various memory devices 130A-C.

A host page table 182A-B includes entries that map PFN 210A-E (or 240A-F), for example an address of the guest OS 196A-B, with an address 230A-E (or 260A-F), for example an address of the host OS 186. Host page tables 182A-B may be used together with any paging data structure used by the VMs 170A-B to support translation from guest OS 196A-B to host OS 186 addresses (e.g., 32-bit linear address space using a two-level hierarchical paging structure, Physical Address Extension mode, INTEL Extended Memory 64 Technology mode, etc.).

In an example, page tables 182A-B may also include an access status parameter 220A-E (or 250A-F). The access status parameter 220A-E (or 250A-F) indicates an access status for each of the pages (e.g., 330A-E and/or 340A-F). An access status may be used to define for example that a given page is writable (or read-write), write-protected (or read-only), executable (or executable and readable), executable only, inaccessible (or non-present), etc. For example, in FIG. 2, the page associated with virtual PFN x0001 and memory location x03FF has been defined in default page table 182A as 'Read-Only'. The page associated with virtual PFN x0001 and memory location x01AF in alternate page table 182B has been defined as 'Read-Write'. The hypervisor 180 may be used to modify an access status parameter 220A-E (or 250A-F). In an example, a virtual machine 170A-B, guest OS 196A-B, and/or application 198A-D may use the mprotect( ) function to request that the hypervisor 180 modify the access status parameter of a page view or a set of pages. In addition, in an example, a host page table 182A-B may include additional information not shown in FIG. 2 including statistics information, background information, dirty identifiers which may indicate that modifications to a page must be written back to disk, etc.

In an example, one or more page tables 182A-B may be maintained by the hypervisor 180 which map guest OS 196A-B addresses to host OS 186 addresses that are accessible by the hypervisor 180, VMs 170A-B, guest OS 196A-B, Host OS 186, Host OS 186 resources, and/or VM Functions 197A-B. The sizes of different page tables may vary and may include more or fewer entries than are illustrated in FIG. 2.

FIG. 3 illustrates page views and pages, for example a default page view 310, an alternate page view 320, and pages 330A-E and 340A-F, in accordance with an example of the present disclosure. As noted above, a page may be a portion of physical or virtual memory designated for storing data. As used herein, a page view denotes a mapping from addresses designated for use by VM 170A-B to host OS 186 addresses. For example, a default page view 310 is a page view that is referenced by a default page table 182A. In an example, the default page view 310 may denote the mapping from virtual PFNs of a VM 170A-B to host-physical addresses, as used during normal execution of the virtual machine. An alternate page view 320 is a page view that is referenced by an alternate page table 182B, as used during execution of the VM Function 197A-B. In an example, the alternate page view 320 may denote a mapping from addresses designated for use by the VM Function 197A-B to host OS 186 addresses. In the illustrated example in FIG. 3, only a portion of pages on alternate page view 320 are designated for use by the VM Function 197A-B (e.g., 340B-E) and the remaining pages (e.g., 340A and 340F) refer to locations in the alternate page view 320 that are outside the memory location of the VM Function 197A-B. In an example, memory that is designated for use by the VM Function 197A-B refers to memory at which the VM Function 197A-B is stored. In another example, memory that is designated for use by the VM Function 197A-B refers to memory that is generally allocated or accessible to the VM Function 197A-B.

As illustrated in FIG. 3, pages (e.g., 330A and 340A) may be defined by access status parameters (described above in more detail) such as 'read-only' or 'readable-writable' in accordance with their respective page table access status parameters (e.g., 220A and 250A). A VM Function 197A-B may change the mapping of guest-physical addresses to host-physical addresses, e.g., page views 310 or 320, by changing the page tables 182A-B that the processor 120A-C uses to perform memory accesses in the VM 170A-B.

Figure 4:
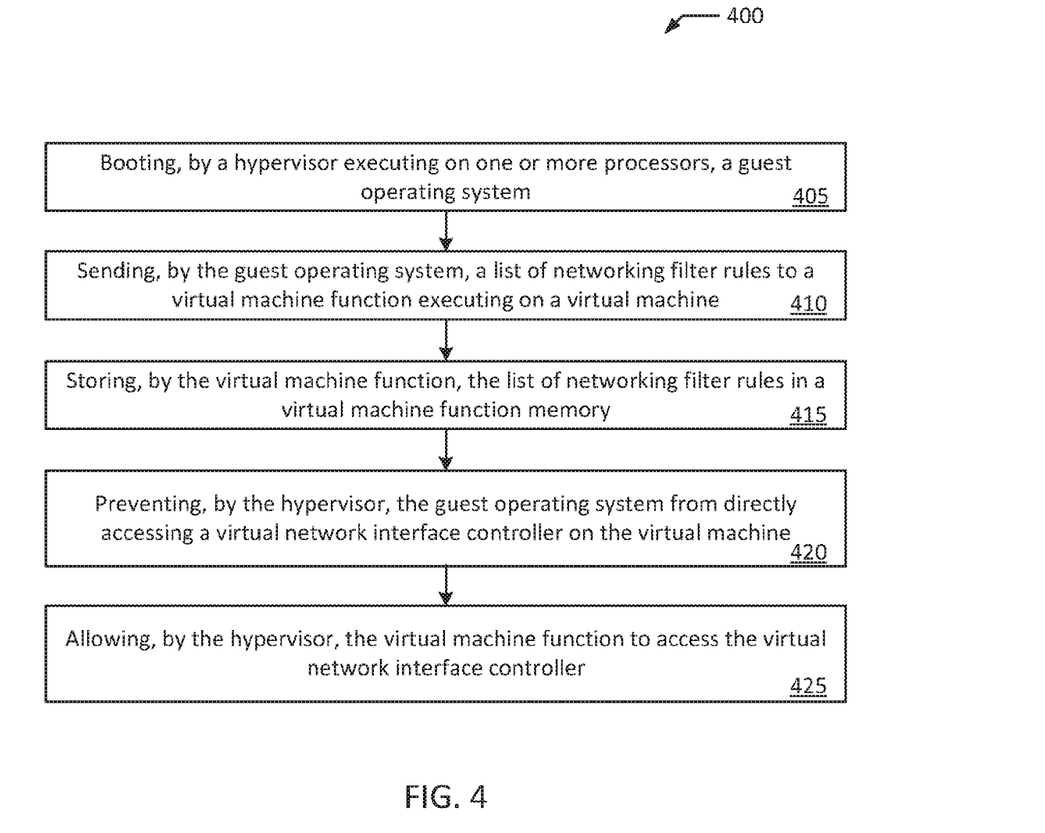
FIG. 4 is a flowchart illustrating an example method of guest netfilter protection by virtual machine function according to an example of the present disclosure.

FIG. 4 shows a flowchart of an example method 400 for guest netfilter protection by virtual machine function. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional.

In the illustrated example, a hypervisor may boot a guest operating system on a virtual machine (block 405). For example, the hypervisor 180 may be configured to execute on CPU 120A-C to boot a guest OS 196A on a VM 170A. Then, the guest operating system may send a list of networking filter rules to a virtual machine function (block 410). For example, the guest OS 196A may send a list of networking filter rules to a VM Function 197A (e.g., a privileged mode). In an example, the virtual machine function may be initialized by the guest operating system. The virtual machine function may be configured to execute on the virtual machine.

Then, the virtual machine function may store the list of networking filter rules in a virtual machine function memory (block 415). For example, the VM Function 197A may store the list of networking filter rules in a Memory 199A. In an example, the virtual machine function memory may be accessible to the guest operating system.

The hypervisor may prevent the guest operating system from directly accessing a virtual network interface controller on the virtual machine (block 420). For example, the hypervisor 180 may prevent the guest OS 196A from directly accessing a VNIC 195A on the VM 170A. In an example, the guest operating system's request to access the virtual network interface controller may be denied from a moment that a request is sent to the hypervisor after the list of networking filter rules are stored in the virtual machine function memory. In another example, the guest operating system's request to access the virtual network interface controller may be denied at any moment after the list of networking filter rules are stored in the virtual machine function memory. The hypervisor may allow the virtual machine function to access the virtual network interface controller (block 425). For example, the hypervisor 180 may allow the VM Function 197A to access the VNIC 195A.

Figure 5:
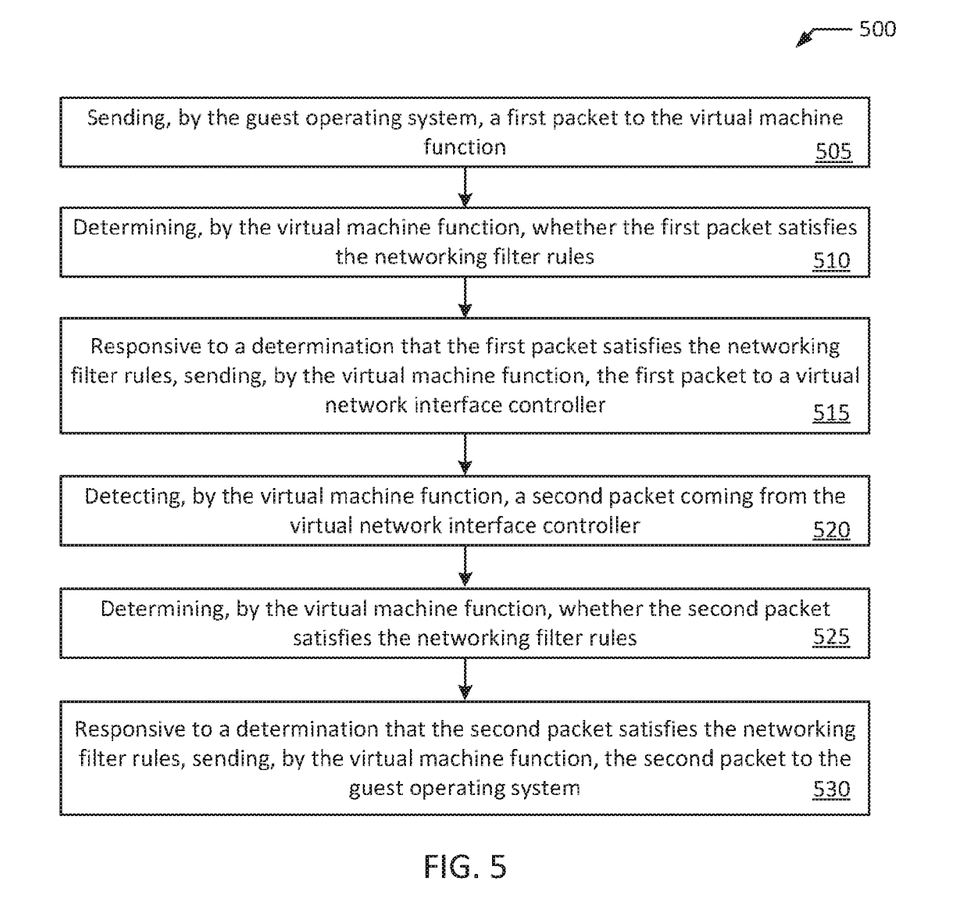
FIG. 5 is a flowchart illustrating an example method of guest netfilter protection by virtual machine function according to an example of the present disclosure.

FIG. 5 shows a flowchart of an example method 500 for guest netfilter protection by virtual machine function. Although the example method 500 is described with reference to the flowchart illustrated in FIG. 5, it will be appreciated that many other methods of performing the acts associated with the method may be used. For example, the order of some of the blocks may be changed, certain blocks may be combined with other blocks, and some of the blocks described are optional.

In the illustrated example, a guest operating system may send a packet to a virtual machine function (block 505). For example, the guest OS 196A may send a packet to the VM Function 197A. In an example, the guest operating system may send a plurality of packets to the virtual machine function. Then, the virtual machine function may determine whether the packet satisfies the networking filter rules stored in a virtual machine function memory (block 510). For example, the VM Function 197A may determine whether the packet satisfies the networking filter rules stored in the Memory 199A.

In an example, the virtual machine function may send the packet to a virtual network interface controller responsive to a determination that the packet satisfies the networking filter rules (block 515). For example, the VM Function 197A may send the packet to the VNIC 195A responsive to a determination that the packet satisfies the networking filter rules. In an example, the virtual machine function may block the packet if the packet fails to satisfy or pass the list of networking filter rules.

In an example, the virtual network interface controller (e.g., VNIC 195A-B) may send a packet to the virtual machine function (e.g., VM Function 197A-B). In an example embodiment, the virtual network interface controller may send a plurality of packets to the virtual machine function. In an example embodiment, the virtual network interface controller may be prevented from submitting a packet directly to the guest operating system. For example, in order to transmit a packet, the virtual network interface controller may need to submit it to the virtual machine function, instead of transmitting it to the guest operating system directly. The virtual machine function may detect the packet coming from the virtual network interface controller (block 520). For example, the VM Function 197A may detect the packet coming from the VNIC 195A. Then, the virtual machine function may determine whether the packet satisfies the networking filter rules (block 525). For example, the VM Function 197A may determine whether the packet coming from the VNIC 195A satisfies the networking filter rules.

Responsive to a determination that the packet satisfies the networking filter rules, the virtual machine function may send the packet to the guest operating system (block 530). For example, once it is determined that the packet satisfies the networking filter rules, the VM Function 197A may send the packet to the guest OS 196A. In an example embodiment, the virtual machine function may block the packet if the packet fails to satisfy or pass the list of networking filter rules.

Figure 6:
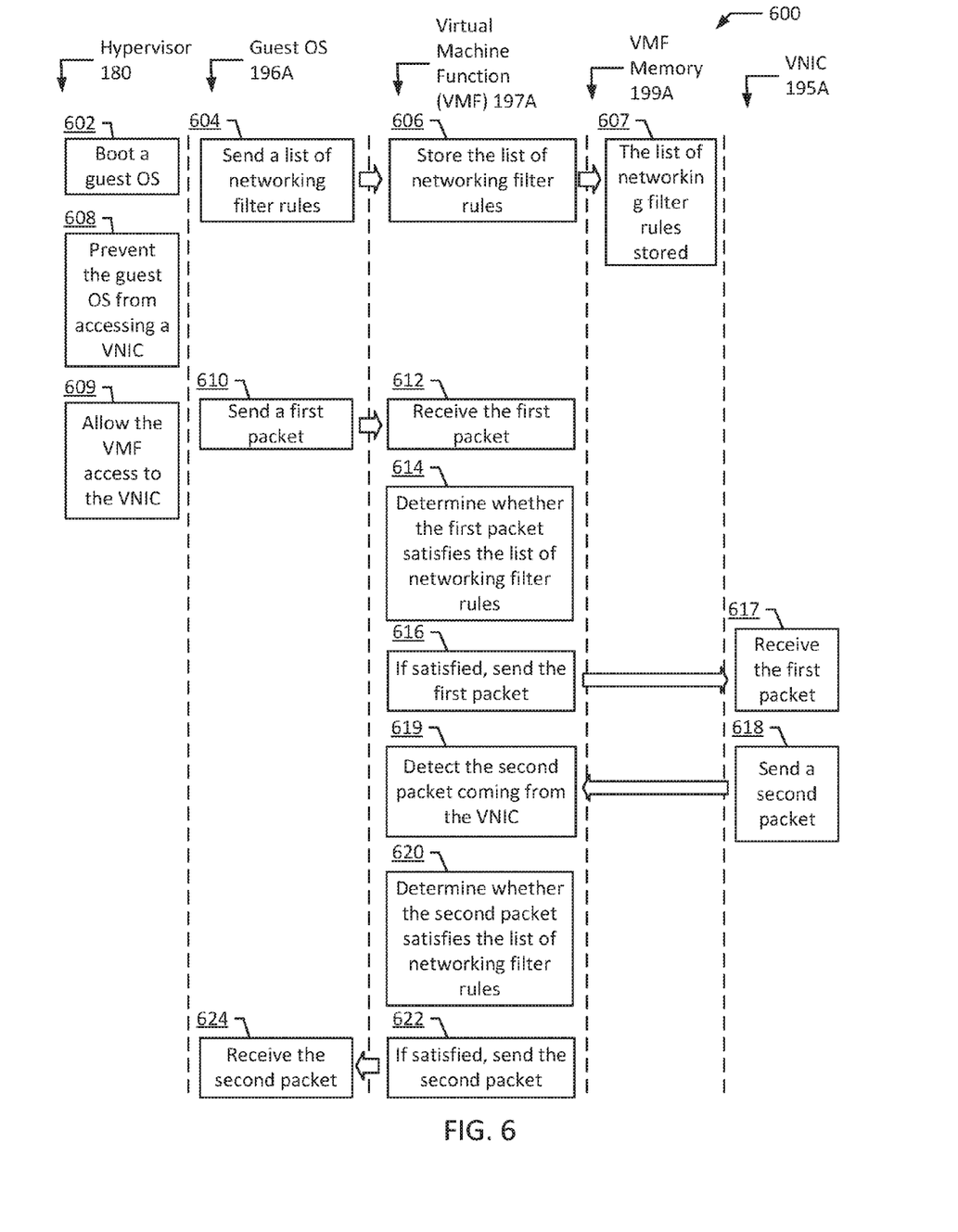
FIG. 6 is a flow diagram illustrating an example process for guest netfilter protection by virtual machine function according to an example of the present disclosure.

FIG. 6 illustrates a flow diagram of an example method 600 for guest netfilter protection by virtual machine function according to an example of the present disclosure. Although the example method 600 is described with reference to the flow diagram illustrated in FIG. 6, it will be appreciated that many other methods of performing the acts associated with the method may be used. For example, the order of some of the blocks may be changed, certain blocks may be combined with other blocks, and some of the blocks described are optional. The method 600 may be performed by processing logic that may include hardware (circuitry, dedicated logic, etc.), software, or a combination of both.

In the example process 600, data may flow between a hypervisor 180, guest operating systems (e.g., guest OS 196A-B), virtual machine functions (e.g., VM Function 197A-B), virtual machine function memories (e.g., Memory 199A-B), and virtual network interface controllers (e.g., VNIC 195A-B) to provide guest netfilter protection by virtual machine function. In the illustrated example embodiment, the hypervisor 180 may boot a guest OS 196A on a virtual machine 170A (block 602). The hypervisor 180 may be configured to execute on one or more processors 120A-C. The guest OS 196A may send a list of networking filter rules to a VM Function 197A (block 604). The VM Function 197A may be configured to execute on the virtual machine 170A. Then, the VM Function 197A may store the list of networking filter rules in a virtual machine function memory 199A (blocks 606 and 607).

In an example embodiment, the hypervisor 180 may prevent the guest OS 196A from directly accessing a VNIC 195A on the virtual machine 170A (block 608). In an example embodiment, the guest OS 196A's request to access the VNIC 195A is denied from a moment that a request is sent to the hypervisor 180 after the networking filter rules are stored in the virtual machine function memory 199A. In another example embodiment, the guest OS 196A's request to access the VNIC 195A is denied at any moment after the networking filter rules are stored in the virtual machine function memory 199A. In an example embodiment, the hypervisor 180 may allow the VM Function 197A to access the VNIC 195A (block 609). In an example, the VNIC 195A may be an emulated NIC. In another example, the VNIC 195A may be a paravirtualized NIC.

In an example embodiment, the hypervisor 180 may include a first host page table 182A for the guest OS 196A and a second host page table 182B for the VM Function 197A. In an example embodiment, the hypervisor 180 may configure the first host page table 182A for the guest OS 196A to disallow access to the VNIC 195A. The hypervisor 180 may also configure the second host page table 182B for the VM Function 197A to allow access to the VNIC 195A. In an example embodiment, the hypervisor 180 may prevent the guest OS 196A from accessing the VM Function 197A unless the guest OS 196A is executing a specific instruction. For example, this instruction may include a VMFUNC instruction, which may be executed by the processors 120A-C. For example, a VMFUNC instruction may be emulated by the hypervisor 180.

In an example embodiment, the VM Function 197A may be implemented by means of host page table switching (e.g. EPT switching). For example, a host page table 182A is selected depending on whether the VM Function 197A is used. If the VM Function 197A is used, the alternative host page table 182B for the VM Function 197A is selected. If the VM Function 197A is not used, the default host page table 182A for the guest OS 196A is selected.

In an example embodiment, the VM Function 197A may receive from the guest OS 196A a request to add an additional rule to the list of networking filter rules stored in the virtual machine function memory 199A. Responsive to receiving the request to add the additional rule, the VM Function 197A may add the additional rule to the list of networking filter rules. In this way, aspects of the present disclosure may be capable of increasing security of the system at any time desired after the initial boot by adding additional rules by the guest OS 196A. In an example embodiment, the VM Function 197A may receive from the guest OS 196A a request to modify the list of networking filter rules stored in the virtual machine function memory 199A. Responsive to receiving the request to modify the list of networking filter rules, the VM Function 197A may deny the request to modify the list of networking filter rules. In an example embodiment, the VM Function 197A may deny the request to modify the list of networking filter rules by ignoring the request to modify the list of networking filter rules.

In an example embodiment, the guest OS 196A may send a packet to the VM Function 197A (block 610). Responsive to receiving the packet (block 612), the VM Function 197A may determine whether the packet satisfies the list of networking filter rules (block 614). In an example embodiment, the VM Function 197A may send the packet to the VNIC 195A responsive to a determination that the packet satisfies the networking filter rules (block 616) and the VNIC 195A may receive the packet (block 617).

In an example embodiment, the VNIC 195A may send a packet to the VM Function 197A (block 618). Then, the VM Function 197A may detect the packet coming from the VNIC 195A (block 619). The VM Function 197A may determine whether the packet satisfies the list of networking filter rules (block 620). In an example embodiment, responsive to a determination that the packet satisfies the networking filter rules, the VM Function 197A may send the packet to the guest OS 196A (block 622) and the guest OS 196A may receive the packet (block 624). A packet may refer to a discrete chunk of data that is transmitted between an origin and a destination on a network. After receiving the packet, the guest OS 196A may place the packet into a memory of the guest OS 196A.

Figure 7:
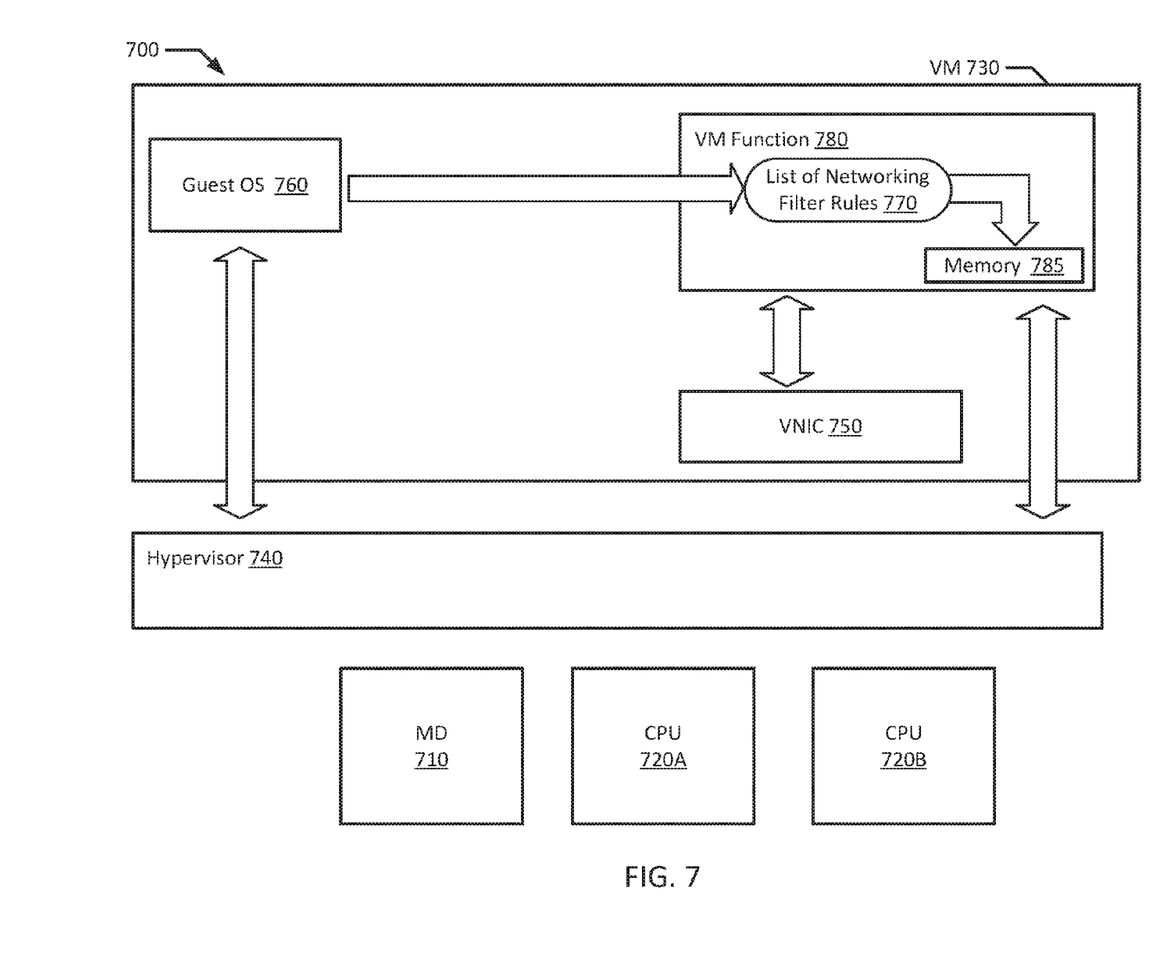
FIG. 7 is a block diagram of an example system according to an example of the present disclosure.

FIG. 7 shows a block diagram of an example guest netfilter protection system according to an example of the present disclosure. As illustrated in FIG. 7, an example system 700 may include a memory 710, one or more processors 720A-B, in communication with the memory 710, a virtual machine 730, a hypervisor 740, and a virtual network interface controller 750 on the virtual machine 730. The virtual machine 730 and the hypervisor 740 may be configured to execute on the one or more processors 720A-B. The hypervisor 740 may be configured to boot a guest operating system 760 on the virtual machine 730. Then, the guest operating system 760 is configured to send a list of networking filter rules 770 to a virtual machine function 780. The virtual machine function 780 is configured to be executed on the virtual machine 730. The virtual machine function 780 is configured to store the list of networking filter rules 770 in a virtual machine function memory 785. The hypervisor 740 is further configured to prevent the guest operating system 760 from directly accessing the virtual network interface controller 750 and allow the virtual machine function 780 to access the virtual network interface controller 750.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
one or more processors, in communication with the memory;
a virtual machine to execute on the one or more processors;
a hypervisor to execute on the one or more processors; and
a virtual network interface controller on the virtual machine,
wherein the one or more processors are configured to:
boot, by the hypervisor, a guest operating system on the virtual machine;
send, by the guest operating system, a list of networking filter rules to a virtual machine function, wherein the virtual machine function is configured to be executed on the virtual machine;
store, by the virtual machine function, the list of networking filter rules in a virtual machine function memory;
prevent, by the hypervisor, the guest operating system from directly accessing the virtual network interface controller; and
allow, by the hypervisor, the virtual machine function to access the virtual network interface controller.

2. The system of claim 1, wherein the one or more processors are further configured to:
send, by the guest operating system, a packet to the virtual machine function;
determine, by the virtual machine function, whether the packet satisfies the networking filter rules; and
responsive to a determination that the packet satisfies the networking filter rules, send, by the virtual machine function, the packet to the virtual network interface controller.

3. The system of claim 1, wherein the virtual machine function is further configured to:
detect a packet coming from the virtual network interface controller;
determine whether the packet satisfies the networking filter rules; and
responsive to a determination that the packet satisfies the networking filter rules, send the packet to the guest operating system.

4. The system of claim 1, wherein the hypervisor includes a first host page table for the guest operating system and a second host page table for the virtual machine function.

5. The system of claim 4, wherein the hypervisor is further configured to:
configure the first host page table to disallow access to the virtual network interface controller; and
configure the second host page table to allow access to the virtual network interface controller.

6. The system of claim 1, wherein the hypervisor is configured to prevent the guest operating system from accessing the virtual machine function unless the guest operating system is executing a specific instruction.

7. The system of claim 1, wherein the virtual machine function is further configured to:
receive from the guest operating system a request to add an additional rule to the list of networking filter rules stored in the virtual machine function memory; and
responsive to receiving the request to add the additional rule, add the additional rule to the list of networking filter rules.

8. The system of claim 1, wherein the virtual machine function is further configured to:
receive from the guest operating system a request to modify the list of networking filter rules stored in the virtual machine function memory; and
responsive to receiving the request to modify the list of networking filter rules, deny the request to modify the list of networking filter rules.

9. The system of claim 8, wherein the virtual machine function denies the request to modify the list of networking filter rules by ignoring the request to modify the list of networking filter rules.

10. A method comprising:
booting, by a hypervisor to execute on one or more processors on a computer system, a guest operating system on a virtual machine;
sending, by the guest operating system, a list of networking filter rules to a virtual machine function to execute on the virtual machine;
storing, by the virtual machine function, the list of networking filter rules in a virtual machine function memory;
preventing, by the hypervisor, the guest operating system from directly accessing a virtual network interface controller on the virtual machine; and
allowing, by the hypervisor, the virtual machine function to access the virtual network interface controller.

11. The method of claim 10, further comprising:
sending, by the guest operating system, a packet to the virtual machine function;
determining, by the virtual machine function, whether the packet satisfies the networking filter rules; and
responsive to a determination that the packet satisfies the networking filter rules, sending, by the virtual machine function, the packet to the virtual network interface controller.

12. The method of claim 10, further comprising:
detecting, by the virtual machine function, a packet coming from the virtual network interface controller;
determining, by the virtual machine function, whether the packet satisfies the networking filter rules; and
responsive to a determination that the packet satisfies the networking filter rules, sending, by the virtual machine function, the packet to the guest operating system.

13. The method of claim 10, wherein the hypervisor includes a first host page table for the guest operating system and a second host page table for the virtual machine function.

14. The method of claim 13, further comprising:
configuring, by the hypervisor, the first host page table to disallow access to the virtual network interface controller; and
configuring, by the hypervisor, the second host page table to allow access to the virtual network interface controller.

15. The method of claim 10, further comprising preventing, by the hypervisor, the guest operating system from accessing the virtual machine function unless the guest operating system is executing a specific instruction.

16. The method of claim 10, further comprising:
receiving, by the virtual machine function, from the guest operating system a request to add an additional rule to the list of networking filter rules stored in the virtual machine function memory; and
responsive to receiving the request to add the additional rule, adding, by the virtual machine function, the additional rule to the list of networking filter rules.

17. The method of claim 10, further comprising:
receiving, by the virtual machine function, from the guest operating system a request to modify the list of networking filter rules stored in the virtual machine function memory; and
responsive to receiving the request to modify the list of networking filter rules, denying, by the virtual machine function, the request to modify the list of networking filter rules.

18. The method of claim 17, wherein the virtual machine function denies the request to modify the list of networking filter rules by ignoring the request to modify the list of networking filter rules.

19. A non-transitory machine readable medium storing instructions, which when executed by a processor, cause the processor to:
boot, by a hypervisor to execute on one or more processors on a computer system, a guest operating system on a virtual machine;
send, by the guest operating system, a list of networking filter rules to a virtual machine function to execute on the virtual machine;
store, by the virtual machine function, the list of networking filter rules in a virtual machine function memory;
prevent, by the hypervisor, the guest operating system from directly accessing a virtual network interface controller on the virtual machine; and
allow, by the hypervisor, the virtual machine function to access the virtual network interface controller.

20. The non-transitory machine readable medium of claim 19, further comprising instructions, which when executed by the processor, cause the processor to:
send, by the guest operating system, a first packet to the virtual machine function;
determine, by the virtual machine function, whether the first packet satisfies the networking filter rules;
responsive to a determination that the first packet satisfies the networking filter rules, send, by the virtual machine function, the first packet to the virtual network interface controller;
detect a second packet coming from the virtual network interface controller;
determine whether the second packet satisfies the networking filter rules; and
responsive to a determination that the second packet satisfies the networking filter rules, send the second packet to the guest operating system.

* * * * *